S. E. ALLEY & R. McGREGOR.
AUTOMATIC VALVE OF DISK FORM.
APPLICATION FILED MAY 13, 1913.

1,081,803.

Patented Dec. 16, 1913.

WITNESSES

INVENTORS
STEPHEN EVANS ALLEY
ROBERT McGREGOR
By their Attorneys

UNITED STATES PATENT OFFICE.

STEPHEN EVANS ALLEY, OF GLASGOW, SCOTLAND, AND ROBERT McGREGOR, OF LONDON, ENGLAND.

AUTOMATIC VALVE OF DISK FORM.

1,081,803.　　　　Specification of Letters Patent.　　Patented Dec. 16, 1913.

Application filed May 13, 1913. Serial No. 767,431.

*To all whom it may concern:*

Be it known that we, STEPHEN EVANS ALLEY and ROBERT McGREGOR, subjects of the King of Great Britain and Ireland, and residents, respectively, of Glasgow, Scotland, and London, England, have invented certain new and useful Improvements in Automatic Valves of Disk Form, of which the following is the specification.

The invention has for its object to provide a simple and effective form of externally spring-controlled disk valve.

A valve made according to the invention is of thin parallel-sided annular form and may control one or more series of the usual annular ports. Where it controls more than one series of ports, it is annularly slotted to permit of the escape of the fluid it controls from the intermediate ports. It is held upon its seat by a series of hollow plungers symmetrically disposed around the valve with their axes normal to it operating in cylindrical cavities in the usual guard above the valve and projections upon the ends of which, or of some of which engage recesses in the valve. Springs acting in compression are arranged between the plungers and the inner ends of the cavities in which they work, and serve to control the movements of the valve.

Figure 1:
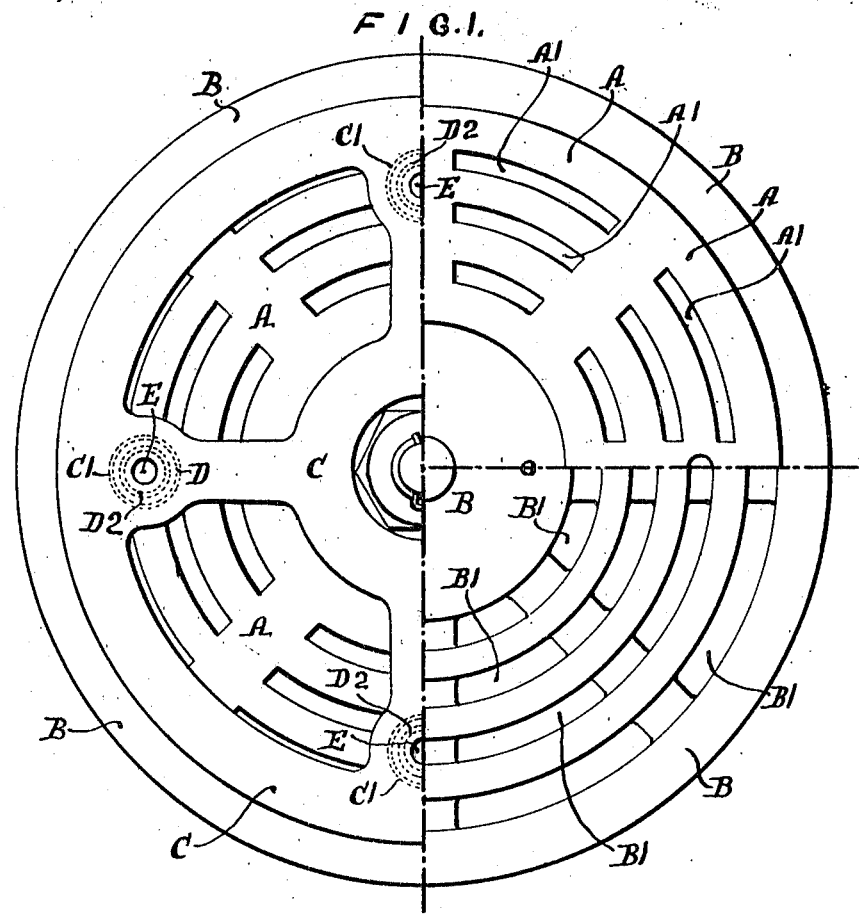
Figure 2:
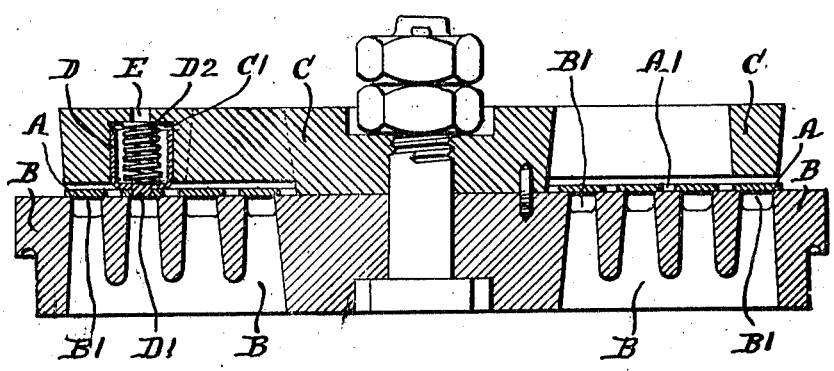

In order that the invention and the manner of performing the same may be properly understood, there is hereunto appended a sheet of explanatory drawings illustrative of an example of the improved valve and allied parts, Figure 1 being a divided plan and Fig. 2 a sectional elevation.

In this example the thin annular valve A controls a series of annular ports $B^1$ in a valve seat B—consequently it is provided with a series of annular fluid-escape slots $A^1$. It is held in place by a guard C in the usual arms of which are cylindrical cavities $C^1$ in which are a series of hollow plungers D, cavities and plungers being symmetrically disposed around the valve with their axes normal to it. Projections $D^1$ on the ends of the plungers—or, it might be only on two of them—engage recesses in the valve, these projections serve to locate the valve and are the only means for so doing. Springs $D^2$ acting in compression are arranged between the plungers D and the inner ends of the cavities $C^1$. Vents E are provided at the inner ends of the cavities $C^1$.

What we claim is:—

In automatic valves, in combination, an annular disk valve controlling ports of usual form, a series of hollow plungers symmetrically disposed around the valve and bearing upon it, a usual guard above the valve, having cavities therein in which the plungers operate, and a series of springs acting between the inner ends of the cavities and the plungers, and means for locating the valve consisting of coöperating recesses and projections in the valve and on the plungers.

In testimony whereof we have signed our names to this specification, in the presence of subscribing witnesses.

STEPHEN EVANS ALLEY.
ROBERT McGREGOR.

Witnesses:
DAVID FERGUSON,
WILFRED HUNT,
WILLIAM JOHN BALFOUR-MURPHY,
HERBERT WALTER STACEY.